(12) United States Patent
Kruse et al.

(10) Patent No.: US 8,924,573 B2
(45) Date of Patent: Dec. 30, 2014

(54) SECURE CAPABILITY NEGOTIATION BETWEEN A CLIENT AND SERVER

(75) Inventors: David Matthew Kruse, Kirkland, WA (US); Mathew George, Bellevue, WA (US); Iuliu Rus, Duval, WA (US)

(73) Assignee: Microsoft Corporation, Redmond, WA (US)

(*) Notice: Subject to any disclaimer, the term of this patent is extended or adjusted under 35 U.S.C. 154(b) by 331 days.

(21) Appl. No.: 13/418,256

(22) Filed: Mar. 12, 2012

(65) Prior Publication Data
US 2013/0238809 A1 Sep. 12, 2013

(51) Int. Cl.
G06F 15/16 (2006.01)

(52) U.S. Cl.
USPC .............................. 709/228; 709/230; 713/188

(58) Field of Classification Search
CPC .............................. H04L 63/08; H04L 63/205
USPC .................................... 709/228, 230; 713/188
See application file for complete search history.

(56) References Cited

U.S. PATENT DOCUMENTS

| | | | |
|---|---|---|---|
| 6,310,873 B1 | 10/2001 | Rainis et al. | |
| 6,453,354 B1* | 9/2002 | Jiang et al. | 709/229 |
| 7,086,086 B2 | 8/2006 | Ellis | |
| 7,591,012 B2 | 9/2009 | Jaganathan et al. | |
| 7,941,833 B2 | 5/2011 | Zick et al. | |
| 8,010,778 B2 | 8/2011 | Zhao et al. | |
| 8,453,209 B2* | 5/2013 | Cen et al. | 726/4 |
| 2005/0060557 A1* | 3/2005 | Lin | 713/188 |
| 2005/0248803 A1* | 11/2005 | Ohara | 358/1.15 |
| 2006/0271697 A1* | 11/2006 | Kruse et al. | 709/230 |
| 2008/0313698 A1* | 12/2008 | Zhao et al. | 726/1 |
| 2009/0217347 A1* | 8/2009 | Chen | 726/1 |
| 2009/0328147 A1* | 12/2009 | Goel et al. | 726/3 |
| 2012/0236796 A1* | 9/2012 | Lazaridis et al. | 370/328 |

OTHER PUBLICATIONS

Kwak, et al., "A WTLS Handshake Protocol with User Anonymity and Forward Secrecy", in Proceedings of 7th CDMA International Conference on Mobile Communications, 2002, pp. 219-230, 12 pp.*
"Versioning and Capability Negotiation", Retrieved on: Dec. 23, 2011, 2 pp. URL:http://msdn.microsoft.com/en-us/library/cc246492(v=prot.13).aspx.

* cited by examiner

*Primary Examiner* — Michael C Lai
(74) *Attorney, Agent, or Firm* — Henry Gabryjelski; Kate Drakos; Micky Minhas

(57) ABSTRACT

Embodiments of the present disclosure provide for establishing an authenticated session between a client computing device and a remote computing device. In certain embodiments, a connection is established between the client computing device and the remote computing device. Once the connection is established, the client computing device sends a number of requests to the client computing device including a negotiate request, a setup request, and a validation request. In response to the requests, the client computing device receives a number of responses from the remote computing device including a negotiate response, setup response and a validation response. Once the responses have been received, a determination is made as to whether information contained in the validation response matches information contained in the negotiate response. If the information matches, an authenticated session is established between the remote computing device and the client computing device.

20 Claims, 8 Drawing Sheets

SECURE CAPABILITY NEGOTIATION BETWEEN A CLIENT AND SERVER

BACKGROUND

In current computer to computer communication negotiations, e.g., client/server or server/server, it is difficult to ascertain whether a particular server is capable of implementing the same communication standards and security features of the client and vice versa. Typically, if the client and server do not implement the same security features or communication standard, one device may revert to an older communication standard that is accepted by the other device. However, the reversion to the older communication standard may result in less secure communications between the client and the server. As a result, sensitive data communicated between the client and server may be lost or compromised. For instance, if an attack succeeds, the attacker can gain confidential information, inject false data in the system, and deny the clients access to information.

Although relatively specific problems have been discussed, it should be understood that the embodiments disclosed herein should not be limited to solving the specific problems identified in the background.

BRIEF SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter.

Embodiments of the present disclosure provide for establishing an authenticated session between a client computing device and a server or remote computing device. In certain embodiments, a connection is established between the client computing device and the remote computing device. Once the connection is established, the client computing device sends a number of requests to the remote computing device including a negotiate request, a setup request, and a validation request. In response to the requests, the client computing device receives a number of responses from the remote computing device including a negotiate response, setup response and a validation response. Once the responses have been received, a determination is made as to whether information contained in the validation response matches information contained in the negotiate response. If the information matches, an authenticated session is established between the remote computing device and the client computing device.

In another embodiment, a method is provided for establishing an authenticated session between a remote computing device and a client computing device. In such embodiments, the remote computing device receives a number of requests from a client computing device including a negotiate request, a setup request and a validation request. In response to these requests, the remote computing device sends a number of responses to the client computing device, including a negotiate response and a setup response. When the remote computing device receives the validation request, a determination is made as to whether information contained in the validation request matches information contained in the negotiate request. If the information in the validation request matches the information in the negotiate request, the remote computing devices sends a validation response to the client computing device.

Embodiments disclosed herein may be implemented as a computer process, a computing system or as an article of manufacture such as a computer program product or computer readable media. The computer program product may be computer storage media readable by a computer system and encoding a computer program of instructions for executing a computer process. The computer program product may also be a propagated signal on a carrier readable by a computing system and encoding a computer program of instructions for executing a computer process.

BRIEF DESCRIPTION OF THE DRAWINGS

Further features, aspects, and advantages will become better understood by reference to the following detailed description, appended claims, and accompanying figures, wherein elements are not to scale so as to more clearly show the details, wherein like reference numbers indicate like elements throughout the several views, and wherein:

DETAILED DESCRIPTION

Various embodiments are described more fully below with reference to the accompanying drawings, which form a part hereof, and which show specific exemplary embodiments. However, embodiments may be implemented in many different forms and should not be construed as limited to the embodiments set forth herein; rather, these embodiments are provided so that this disclosure will be thorough and complete, and will fully convey the scope of the embodiments to those skilled in the art. Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense.

Figure 1:
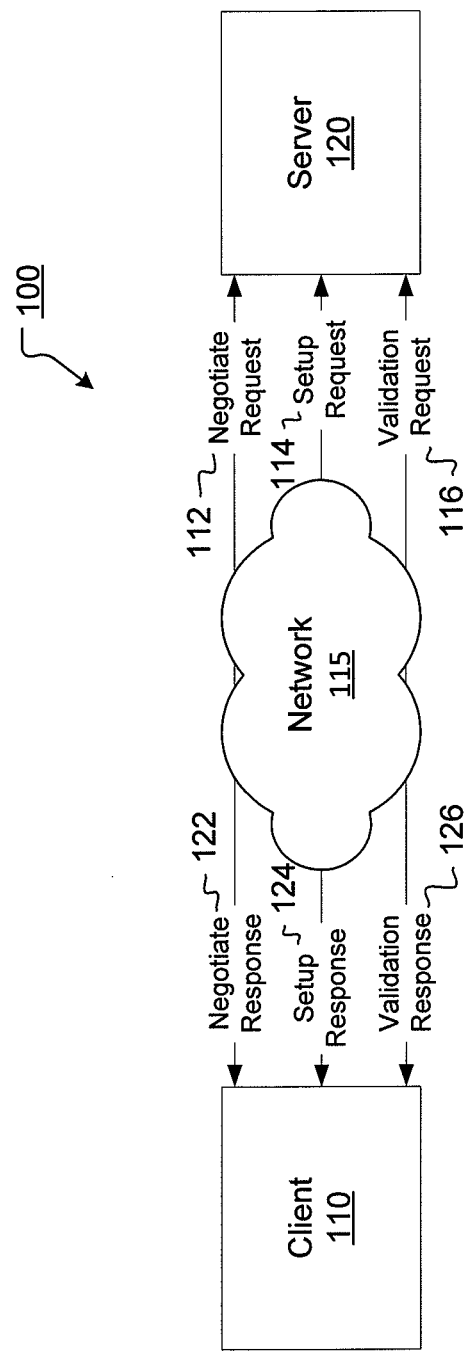
FIG. 1 illustrates a system for establishing an authenticated session according to one or more embodiments.

FIG. 1 illustrates one embodiment of a system 100 that may be used to implement various embodiments of the present disclosure. As shown in FIG. 1, the system 100 may include a client 110 and a remote computer system or server 120. In certain embodiments the client 110 may be a personal computer, laptop computer, tablet computer, mobile phone and the like. Client 110 may communicate with the server 120 through a network 115. Although FIG. 1 only shows one server, it is contemplated that the server 120 may be part of a server cluster (not shown). Additionally, although only one client is shown in FIG. 1, it is also contemplated that multiple clients may access the server 120 or that multiple clients may access different servers in a server cluster using the embodiments described herein.

In embodiments, the client 110 may establish a session for accessing information, such as files or objects, stored on the server 120. As will be explained in detail below, the session is established with the server 120 via a series of requests and responses sent between the client 110 and the server 120. In one embodiment, the session is negotiated using a file access protocol such as a version of the server message block (SMB) protocol or a version of the network fileserver (NFS) protocol.

The client 110 may be configured to establish a session with the server 120 even if the server 120 uses older versions of a protocol or older dialects of a protocol, while still providing some level of security. For example, if the client 110 is configured to utilize the server message block version 2 (SMB2) protocol but the server is not, but is instead configured to utilize an older version of the server message block (SMB) protocol, a specially signed validation request sent from the client 110 to the server 120 can help to ensure that a "man in the middle" is not impersonating the server 120 by pretending to utilize an older version of the protocol that does not support the same security features as the newer version of the protocol utilized by the client.

For example, each time a request or response is sent between the client 110 and the server 120, a man in the middle may intercept the packet, change the data in the packet so that the man in the middle looks like it is an older version of a server that does not support certain security features of the protocol. If the client continues to communicate with the man in the middle, sensitive information may be lost. However, embodiments of the present disclosure may be used to verify that the communication between the client and the server is actually between the client and the server, even if either the server is utilizing an older version of the communication protocol.

To establish an authenticated session with the server 120, the client 110 establishes a connection with the server 120. As discussed above, the connection between the client 110 and the server 120 may be established using a network 115. Once the connection is established, the client 110 sends a negotiate request 112 to the server 120. In certain embodiments, the negotiate request 112 is a packet that is used by the client 110 to notify the server 120 what dialects of the communication protocol the client 110 understands.

For example, if the communication protocol is an SMB2 protocol, the negotiate request may include an identifier of a dialect of SMB2 supported by the client 110. In certain embodiments, the client 110 may support a plurality of dialects. For example, the dialects listed in the negotiate request 112 may include a SMB 2.002 dialect, a SMB 2.1 dialect and/or a SMB 2.2 dialect. Although specific dialects are mentioned in this example, it is contemplated that the client may use more, less and/or different dialects or revisions thereof.

Continuing with the example above, in certain embodiments, the client 110 may represent to the server 120 that the client 110 supports a particular version of a dialect (e.g., SMB 2.2) of the communication protocol. However, in addition to the specified dialect, the client may also support previous versions of the dialect. Therefore, if the server 120 is not configured to support the SMB 2.2 dialect, the server 120 may select an older version of the dialect that is preferred by the server 120. For example, the client 110 may support communication with the server 120 using the SMB 2.002 dialect if the SMB 2.002 dialect is the preferred dialect of the server 120. As discussed in more detail below, the client 110 may also be configured to communicate with the server 120 using an older version of the communication protocol, such as, for example, the SMB protocol instead of the SMB2 protocol if the server does not support the newer version.

In certain embodiments, the negotiate request 112 may also include additional information about the client 110. The additional information may include: (i) a security mode that specifies whether security signatures are enabled on the client 110, are required by the client 110, or both enabled and required; (ii) capability information that specifies, among others, whether the client 110 supports: (a) a Distributed File System (DFS), (b) leasing, (c) multi-credit operations, (d) the establishment of multiple channels for a single session, (e) persistent handles, (f) directory leasing (g) encryption and the like; and (iii) a client identifier generated by the client 110. Although specific, additional client-based information has been disclosed, it is contemplated and those skilled in the art will recognize that the negotiate request 112 may include additional information not specifically set forth above.

When the server 120 receives the negotiate request 112, the server 120 responds with a negotiate response 122. In certain embodiments, the negotiate response 122 is a data packet that is sent by the server 120 to notify the client 110 of a preferred common dialect of the communication protocol. Continuing with the example from above, if the communication protocol is the SMB2 protocol, the server 120 may select either the SMB 2.002 dialect, the SMB 2.1 dialect, or the SMB 2.2 dialect. In another embodiment, the server 120 may select a particular dialect (e.g., SMB 2.1) but also indicate to the client 110 that the server 120 will support future dialect revisions.

The negotiate response 122 may also include additional information about the server 120. In embodiments, this information may include: (i) a security mode that specifies whether security signatures are enabled on server 120, required by the server 120, or enabled and required by the server 120; (ii) capability information of the server 120 that specifies, among others, whether the server 120 supports: (a) a Distributed File System (DFS), (b) leasing, (c) multi-credit operations, (d) the establishment of multiple channels for a single session, (e) persistent handles, (f) directory leasing, (g) encryption and the like; and (iii) a server identifier generated by the server 120 that uniquely identifies the server 120. Although specific information has been disclosed, it is contemplated that the negotiate request 112 may include additional information not specifically set forth above. It is also contemplated that the server 120 may have additional capabilities or fewer capabilities based on the dialect supported by the server 120. For example, some of the capabilities of the server 120 may be present if the server supports one dialect (e.g., SMB 2.2) but may not be available if the server 120 supports another dialect (e.g., SMB 2.002).

Once the negotiate response 122 is received by the client 110, the client 110 sends a session setup request 114 to the server 120. In certain embodiments, the session setup request 114 is a packet of data that is used by the client 110 to request a new authenticated session with the server 120 using a negotiated communication protocol or structure. For example, if the communication protocol is the SMB2 protocol, the session setup request 114 requests a session using the SMB2 protocol upon recognizing that the server supports the SMB2 protocol.

In certain embodiments, the session setup request 114 packet includes additional information such as, for example, the security mode of the client 110, one or more capabilities of the client 110 and the like. In another embodiment, other information is contained in the session setup request 114 such as, for example, a password associated with the client 110 may be used to generate a shared secret or session key. The session key may then be utilized by the client 110 and the server 120 during subsequent packet transmissions.

In response to receiving the session setup request 114, the server 120 sends a session setup response 124 back to the client 110. In certain embodiments, the session setup response 124 is a data packet that includes information corresponding to whether a session between the client 110 and the server was previously established or whether this session setup response 124 must be handled as a new authentication. As discussed above, the session setup response 124 may include the shared secret or the session key that was generated based on information contained in the session setup request 114.

In certain embodiments, the client 110 and the server 120 may be required to validate the negotiate request 112, the negotiate response 122, or both. In such instances, the client 110 may be configured to send a validation request 116 to the server 120. The validation request 116 is sent from the client 110 to the server 120 to verify that the information contained in the negotiate request 112 packet was not altered or changed by a man in the middle attack.

The validation request 116 is a data packet that includes the same information that was sent in the negotiate request 112. Specifically, the validation request 116 includes the capabilities of the client 110 sent in the negotiate request 112, the client identifier included in the negotiate request 112, the security mode sent in the negotiate request 112, and the dialect (e.g., the highest protocol dialect version) supported by the client 110 sent in the negotiate request 112.

In certain embodiments, the validate request 116 is signed by the shared secret that was obtained during the session setup request and response exchange between the client 110 and the server 120. Because the shared secret is known only to the client 110 and the server 120, a man in the middle cannot access and change the information contained in the validation request 116. As a result, and as will be explained below, the server 120 may compare the information contained in the negotiate request 112 to the information contained in the validation request 116. If the information contained in the validation request 116 is different than the information contained in the negotiate request 112, the server 120 is able to determine that a man in the middle changed the information in the negotiate request 112. This determination is made because the validation request 116 was signed using the shared secret while the negotiate request 112 was not signed. Thus, any differences between the information contained in the validation request 116 and the negotiate request 112 may be due to a man in the middle changing the information in the negotiate request 112. As a result of the information in the two requests being different, the server 120 may terminate the connection to the client 110.

If however, the information contained in the validation request 116 matches the information contained in the negotiate request 112, the server 120 may be configured to send a validation response 126 to the client 110. In embodiments, the validation response 126 is a data packet that includes the same information that was included in the negotiate response 122. Specifically, the validation response 126 may include the capabilities of the server 120 included in the negotiate response 122, the server identifier included in the negotiate response 122, the security mode of the server 120 included in the negotiate response 122, and the dialect supported by the server 120 included in the negotiate response 122. As with the validation request 116, the validation response 126 may be signed by the shared secret to ensure that a man in the middle cannot change the information in the validation response 126.

In certain embodiments, when the client 110 receives the validation response 126, the client 110 compares the information contained in the validation response 126 with information contained in the negotiate response 122. If the information contained in the validation response 126 does not match the information contained in the negotiate response 122 (e.g., due to a man in the middle attack), the client 110 may be configured to terminate the connection with the server 120.

As discussed above, because the validation response 126 was signed with the shared secret that is known only to the client 110 and the server 120, a man in the middle cannot access and change the information contained in the validation response 126. Therefore, if the information contained in the validation response 126 does not match the information in the negotiate response 122, it is likely that a man in the middle changed the information in the negotiate response 122 in an attempt to impersonate the server 120.

In another embodiment, it is contemplated that the server 120 may not recognize the validation request 116 from the client 110. However, in certain protocols, such as, for example the SMB or SMB2 protocols, when a server 120 receives a signed request (e.g., a request that is signed with a shared secret, such as, for example, the validation request 116), the server is configured to send back a signed response that indicates that the server does not understand the request. However, because the response from the server is signed with the shared secret that is known only to the client 110 and the server 120, the client 110 may be assured that the server 120 is a legitimate server that is merely supporting an older version of the protocol and not a man in the middle. A man in the middle cannot imitate the signed response from the server 120, even a signed response that indicates that the request is unsupported because the man in the middle does not have access to the shared secret. Therefore, the client 110 may proceed to establish an authenticated session with the server 120 using an older communication protocol.

Figure 2:
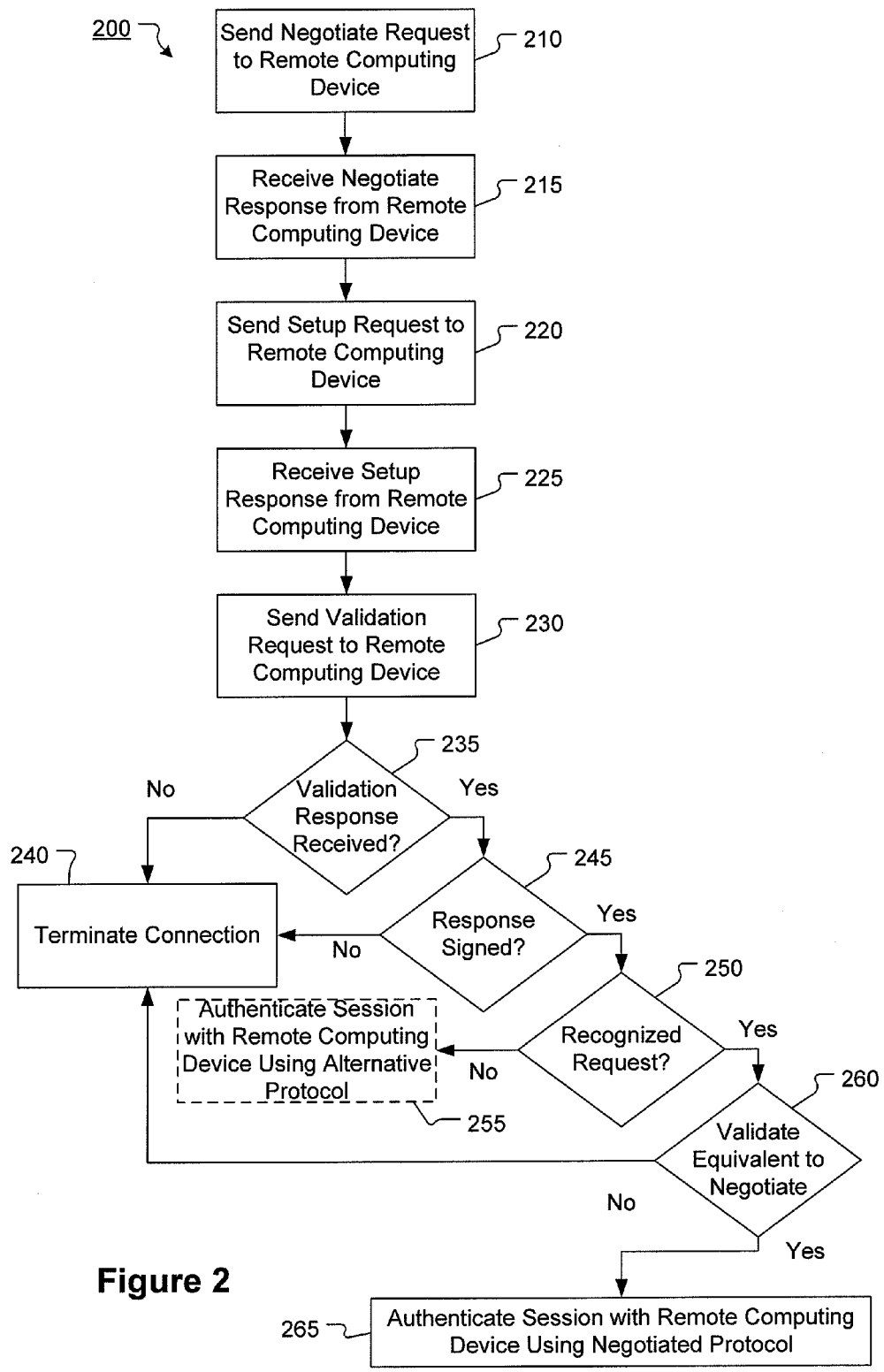
FIG. 2 is a block diagram showing the operation flow for a client computing device requesting the establishment of an authenticated session according to one or more embodiments.

FIG. 2 illustrates a method 200 for a client computing device requesting establishment of an authenticated session according to one or more embodiments. In certain embodiments, one or more components of a system, such as system 100 (FIG. 1), may employ the method 200 to authenticate a session between a client computing device, such as, for example, client 110 and a remote computing device such as, for example, server 120.

Method 200 begins at operation 210 in which a negotiate request is sent from the client computing device to the remote computing device. In certain embodiments the negotiate request includes a first set of information. As discussed above, the first set of information may include dialects of the communication protocol utilized by the client computing device and may also include additional information about the client computing device. In embodiments, this additional information may include a security mode of the client computing device, capability information of the client computing device, and/or an identifier of the client computing device.

In response to the negotiate request, a negotiate response is received 215 from the remote computing device. In certain embodiments, the negotiate response includes a second set of information. The second set of information is associated with the first set of information and may include the preferred common dialect of the remote computing device. Additionally, the second set of information may include a security mode of the remote computing device, capability information of the remote computing device and an identifier of the remote computing device.

Once the negotiate response has been received by the client computing device, flow proceeds to operation 220 in which the client computing device sends a setup request to the remote computing device. In certain embodiments, the setup request, and a corresponding received setup response 225, generates a shared secret between the client computing device and the remote computing device. For example, the SMB2 protocol may rely on authentication through the use of the Generic Security Service Application Programming Interface (GSS-API), which in turn may rely on the Kerberos Protocol Extensions. Furthering the example, when establishing the session, the client computing device may call a GSS authentication protocol which generates a token which is shared with the remote computing device. The remote computing device may then authenticate the token and generate the shared secret.

The setup request and setup response may also be used to determine whether a session was previously established between the remote computing device and the client computing device. The session setup request and response may also indicate whether the previously established session (if identified) will be used for the current session or whether a new session will be created.

Flow then proceeds to operation 230 in which the client computing device sends a validation request to the remote computing device. In certain embodiments, the validation request includes a third set of information. In such embodiments, the third set of information is equivalent to the first set of information contained in the negotiate request. Thus, if the first set of information indicated that the client computing device utilizes the SMB 2.2 dialect of the SMB2 protocol, this dialect information would also be contained in the third set of information.

However, in order to ensure that the information contained in the validation request is not compromised, the validation request may be signed with the shared secret that was generated from the setup request and response. Because the validation request is signed with the shared secret, and the shared secret is known only by the client computing device and the remote computing device, the information contained in the validation request cannot be accessed, changed or duplicated by a man in the middle.

Once the validation request has been sent to the remote computing device, flow proceeds to operation 235 in which a determination is made as to whether a validation response has been received or whether the session between the client computing device and the remote computing device has timed out. In certain embodiments, the validation response may include a fourth set of information. As will be discussed below, the fourth set of information is equivalent to the second set of information contained in the negotiate response.

In certain embodiments, a session times out when a predetermined amount of time elapses between when the client computing device sends a request (e.g., the validation request) and when (if at all) the client computing device receives a response (e.g., the validation response) from the remote computing device. If the predetermined amount of time elapses and the client computing device does not receive the validation response, flow proceeds to operation 240 and the connection between the client computing device and the remote computing device is terminated.

However, if a validation response is received prior to the session timing out, flow proceeds to operation 245 in which a determination is made as to whether the validation response has been signed with the shared secret. In certain embodiments, the client computing device may utilize a communication protocol that requires that all response packets sent from the remote computing device to the client computing device be signed with a shared secret if the initial request packet was also signed with the shared secret. Therefore, if the response is not signed, this may be an indication that the validation response was intercepted and a man in the middle is attempting to impersonate the remote computing device. Therefore, if the validation response is not signed with the shared secret, flow proceeds to operation 240 and the connection is terminated.

If the validation response is signed with the shared secret, flow proceeds to operation 250 in which a determination is made as to whether the validation request was recognized by the remote computing device. As discussed above, the client computing device may utilize various security settings that the remote computing device does not understand or recognize due to the fact that the remote computing device is running an older version of the communication protocol.

However, even if the validation response from the remote computing device indicates that the remote computing device does not recognize the request, it may be desirable to connect to the remote computing device even though the remote computing device is older version or is executing an older version of the communication protocol. Therefore, flow proceeds to operation 255 in which an authenticated session is setup with the remote computing device using an alternative communication protocol or an alternative version of the communication protocol. The operation 255 is shown in dashed lines to indicate that is an optional step used in some embodiments. In such cases, although the request was not recognized by the remote computing device, the client computing device may be assured that the response is actually from the remote computing device because the "unrecognized request" response was signed using the shared secret which was known only by the client computing device and the remote computing device.

If the validation request was recognized by the remote computing device, flow proceeds to operation 260 in which a determination is made as to whether the information contained in the validate response is equivalent to the information contained in the negotiate response. If the information contained in the negotiate response is not equivalent to the information contained in the validation response, flow proceeds to operation 240 and the connection is terminated. Those skilled in the art will appreciate that a comparison of some, i.e., less than all, of the information in the negotiate and validate responses may be adequate to satisfy an analysis as to whether the same server sent both items.

In certain embodiments, the connection is terminated at this stage because if the information contained in the negotiate response is not equivalent to the information contained in the validation response, it is likely that a man in the middle intercepted the negotiate request and changed the information therein. As discussed, because the validation response is signed with the shared secret that is known only to the client computing device and the remote computing device, a man in the middle cannot access the information in the validation response and change the information therein.

However, if the information in the validation response is equivalent to the information contained in the negotiate response, flow proceeds to operation 265 and an authenticated session is established between the remote computing device and the client computing device using the negotiated protocol.

Figure 3:
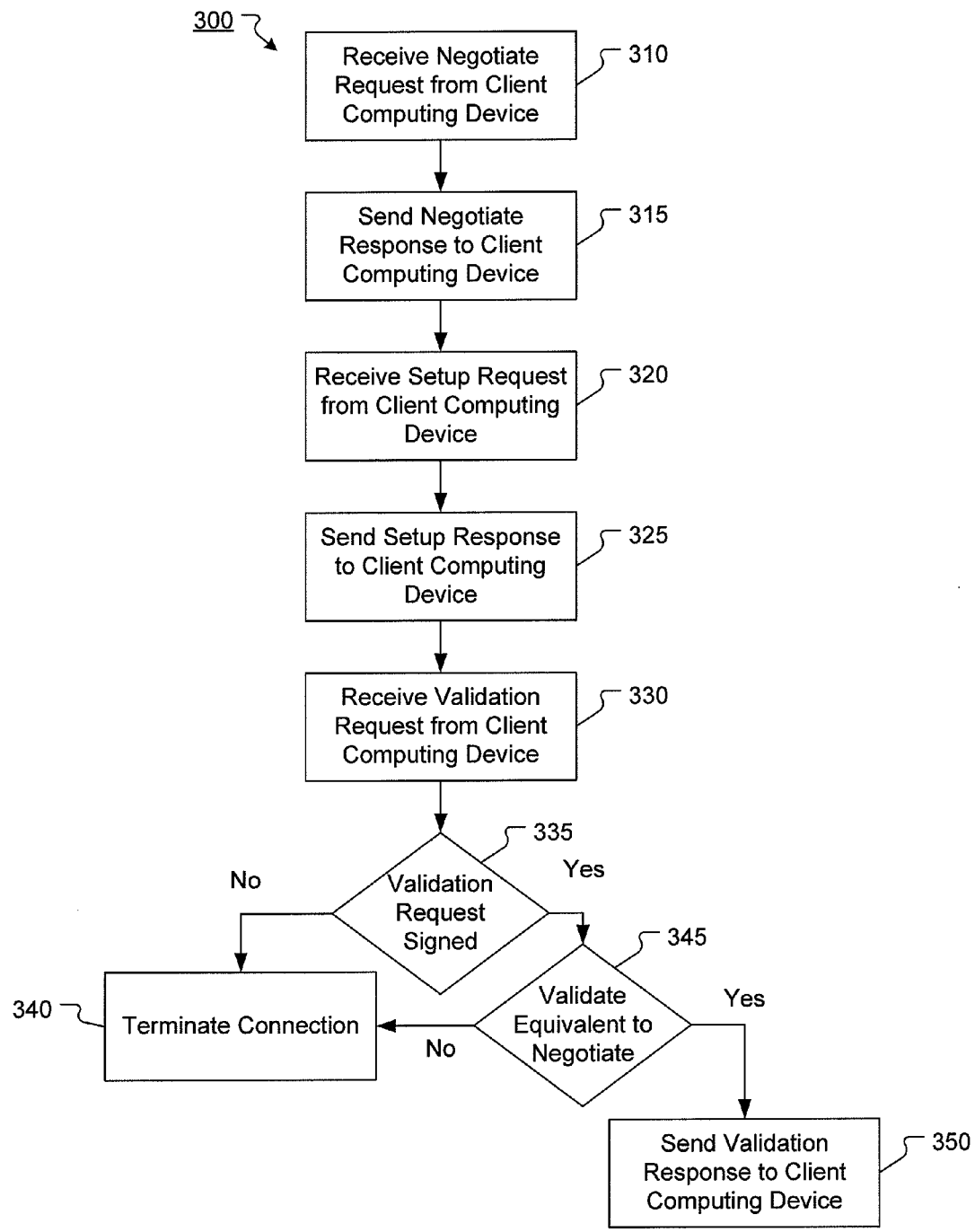
FIG. 3 is a block diagram showing the operation flow for a remote computing device responding to a request for an authenticated session according to one or more embodiments.

FIG. 3 illustrates a method 300 in which a remote computing device responds to a request to establish an authenticated session according to one or more embodiments. In certain embodiments, one or more components of a system, such as system 100 (FIG. 1), may employ the method 300 to authenticate a session between a remote computing device and a client computing device.

Method 300 begins at operation 310 in which a negotiate request is received from a client computing device. In certain embodiments the negotiate request includes a first set of information. As discussed above, the first set of information may include a dialect of the communication protocol utilized by the client computing device, a security mode of the client computing device, capability information of the client computing device, and an identifier of the client computing device.

In response to the negotiate request, flow proceeds to operation 315 in which the remote computing device sends a negotiate response to the client computing device. In certain embodiments, the negotiate response includes a second set of information. The second set of information is associated with the first set of information and may include the preferred common dialect of the remote computing device, a security mode of the remote computing device, capability information of the remote computing device and an identifier of the remote computing device.

Flow then proceeds to operation 320 in which the remote computing device receives a setup request from the client computing device. In certain embodiments, the setup request and a corresponding setup response 325 generates a shared secret that may be used to encode subsequent packets sent between the client computing device and the remote computing device. The setup request and setup response may also be used to determine whether a session was previously established between the remote computing device and the client computing device and whether the previously established session (if identified) will be used for the current session.

Flow then proceeds to operation 330 in which a validation request is received from the client computing device. In certain embodiments, the validation request includes a third set of information. In embodiments, the third set of information is equivalent to the first set of information contained in the negotiate request. Once the validation request is received, flow proceeds to operation 335 in which a determination is made as to whether the validation request is signed with the shared secret.

If the validation request is not signed with the shared secret, flow proceeds to operation 340 and the session between the client computing device and the remote computing device is terminated. As discussed above, if the validation request is not signed with the shared secret, there is no guarantee that the information contained in the validation request was not altered by a man in the middle. However, if the validation request is signed, flow proceeds to operation 345 and a determination is made as to whether the information in the validation request is equivalent to the information contained in the negotiate request. Those skilled in the art will appreciate that a comparison of some, i.e., less than all, of the information in the negotiate and validate requests may be adequate to satisfy an analysis as to whether the same client sent both items.

If the information contained in the negotiate request is not equivalent to the information contained in the validation request, flow proceeds to operation 340 and the connection is terminated. As previously discussed, the connection is terminated because if the information contained in the negotiate request is not equivalent to the information contained in the validation request, it is likely that the negotiate request was intercepted (e.g., by a man in the middle) and the information in the packet was altered. However, if the information in the validation request is equivalent to the information contained in the negotiate request, flow proceeds to operation 350 in which a validation response is sent to the client computing device.

In certain embodiments, the validation response may include a fourth set of information that corresponds to the second set of information. Additionally, the validation response may be signed by the shared secret. In another embodiment, the validation response may include an indication that the validation request was not recognized by the remote computing device (i.e., the remote computing device is executing an older version of the communication protocol that does not support enhanced security features). However, because the validation response was signed using the shared secret, the client computing device may utilize an older version of the communication protocol to establish the session with remote computing device with the assurance that a man in the middle is not impersonating the remote computing device.

Utilizing the embodiments described above, an authenticated session may be established between a client computing device and a remote computing device without sacrificing the added security of newer communication protocols even if the remote computing device does not recognize the security features of the newer communication protocols.

While the various embodiments have been described in the general context of program modules that execute in conjunction with an application program that runs on an operating system on a computer, those skilled in the art will recognize that the embodiments disclosed herein may also be implemented in combination with other program modules. Generally, program modules include routines, programs, components, data structures, and other types of structures that perform particular tasks or implement particular abstract data types.

Figure 4:
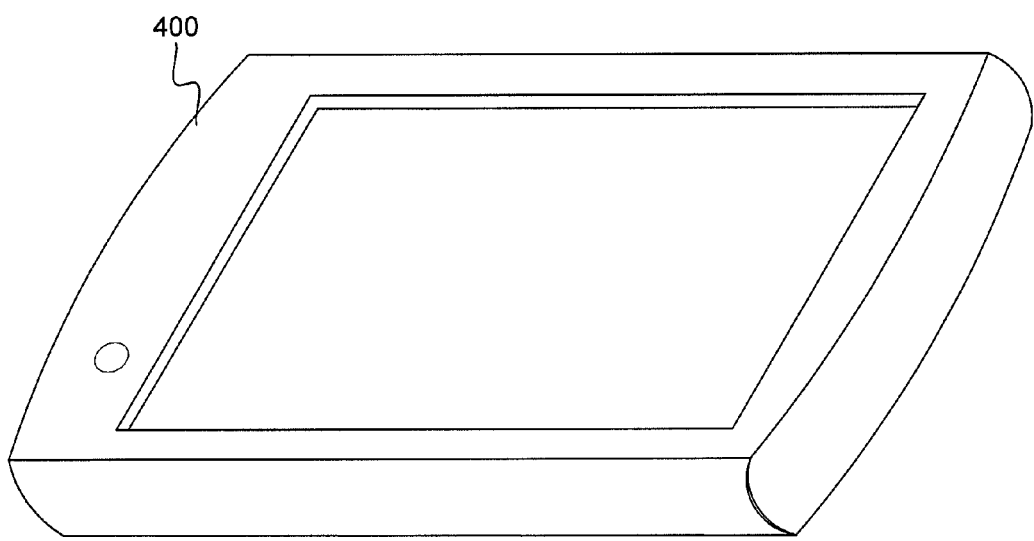
FIG. 4 illustrates a tablet computing device executing one or more embodiments disclosed herein.
Figure 5:
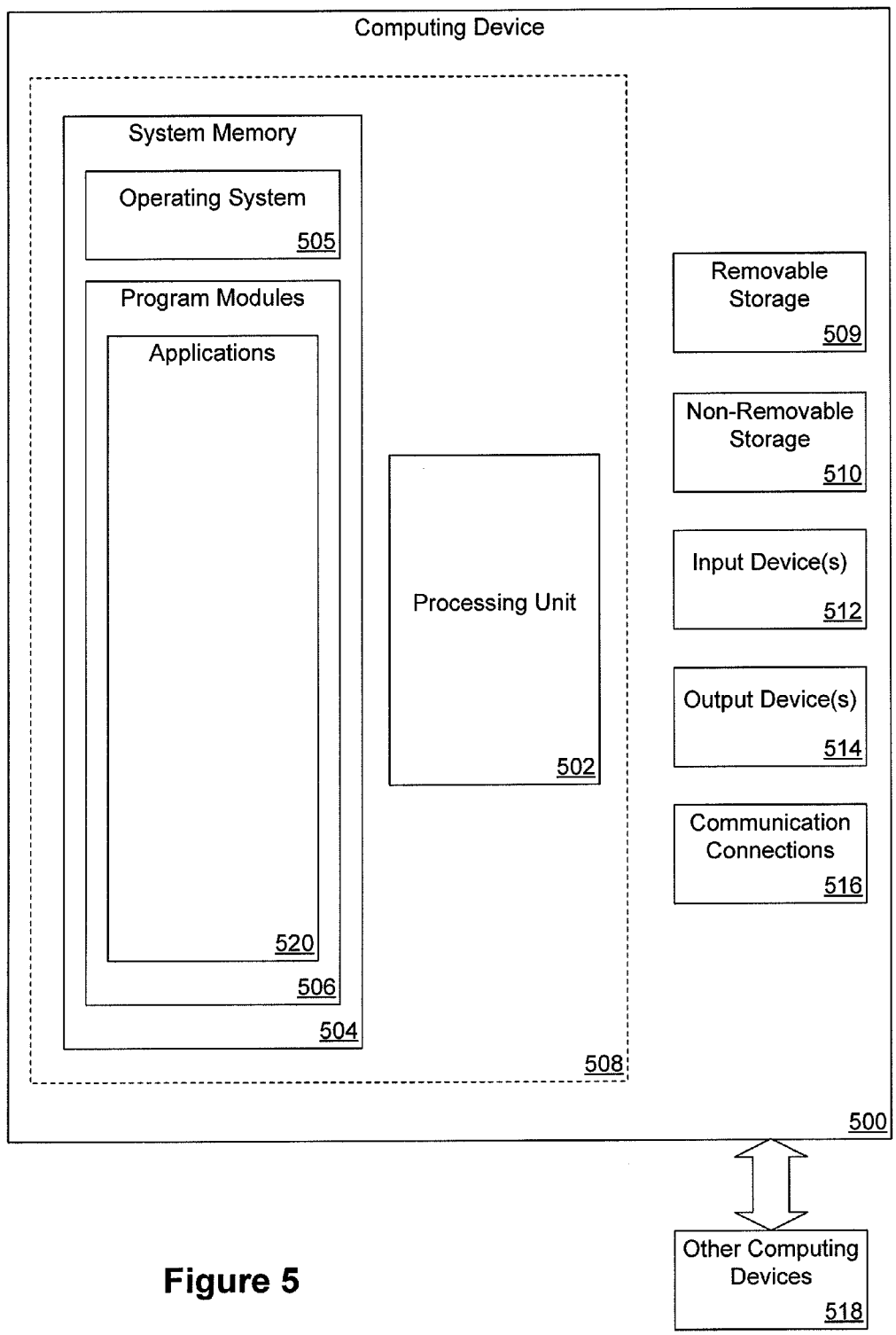
FIG. 5 illustrates a block diagram of a computing environment suitable for implementing one or more embodiments disclosed herein.

The embodiments and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers. FIG. 4 illustrates an exemplary tablet computing device 400 executing embodiments disclosed herein. For example, the tablet computing device may be sending and receiving one or more of the requests and responses described above. In addition, the embodiments and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the present disclosure may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like. FIGS. 5 through 7 and the associated descriptions provide a discussion of a variety of operating environments in which embodiments of the present disclosure may be practiced. However, the devices and systems illustrated and discussed with respect to FIGS. 5 through 7 are for purposes of example and illustration and are not limiting of a vast number of computing device configurations that may be utilized for practicing embodiments of the present disclosure, described herein.

FIG. 5 is a block diagram illustrating exemplary physical components (i.e., hardware) of a computing device 500 with which embodiments of the present disclosure may be practiced. The computing device components described below may be suitable for the computing devices described above. In a basic configuration, the computing device 500 may include at least one processing unit 502 and a system memory 504. Depending on the configuration and type of computing device, the system memory 504 may comprise, but is not limited to, volatile storage (e.g., random access memory), non-volatile storage (e.g., read-only memory), flash memory, or any combination of such memories. The system memory 504 may include an operating system 505 and one or more program modules 506 suitable for running software applications 520. The operating system 505, for example, may be suitable for controlling the operation of the computing device 500. Furthermore, embodiments of the present disclosure may be practiced in conjunction with a graphics library, other operating systems, or any other application program and is not limited to any particular application or system. This basic configuration is illustrated in FIG. 5 by those components within a dashed line 508. The computing device 500 may have additional features or functionality. For example, the computing device 500 may also include additional data storage devices (removable and/or non-removable) such as, for example, magnetic disks, optical disks, or tape. Such additional storage is illustrated in FIG. 5 by a removable storage device 509 and a non-removable storage device 510.

As stated above, a number of program modules and data files may be stored in the system memory 504. While executing on the processing unit 502, the program modules 506 may perform processes including, for example, one or more of the stages of the methods described herein. The aforementioned process is an example, and the processing unit 502 may perform other processes. Other program modules that may be used in accordance with embodiments of the present disclosure may include electronic mail and contacts applications, word processing applications, spreadsheet applications, database applications, slide presentation applications, drawing or computer-aided application programs, etc.

Furthermore, embodiments of the present disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the present disclosure may be practiced via a system-on-a-chip (SOC) where each or many of the components illustrated in FIG. 5 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein may be operated via application-specific logic integrated with other components of the computing device 500 on the single integrated circuit (chip). Embodiments of the present disclosure may also be practiced using other technologies capable of performing logical operations such as, for example, AND, OR, and NOT, including but not limited to mechanical, optical, fluidic, and quantum technologies. In addition, embodiments of the present disclosure may be practiced within a general purpose computer or in any other circuits or systems.

The computing device 500 may also have one or more input device(s) 512 such as a keyboard, a mouse, a pen, a sound input device, a touch input device, etc. The output device(s) 514 such as a display, speakers, a printer, etc. may also be included. The aforementioned devices are examples and others may be used. The computing device 500 may include one or more communication connections 516 allowing communications with other computing devices 518. Examples of suitable communication connections 516 include, but are not limited to, RF transmitter, receiver, and/or transceiver circuitry; universal serial bus (USB), parallel, or serial ports, and other connections appropriate for use with the applicable computer readable media.

Embodiments of the present disclosure, for example, may be implemented as a computer process (method), a computing system, or as an article of manufacture, such as a computer program product or computer readable media. The computer program product may be a computer storage media readable by a computer system and encoding a computer program of instructions for executing a computer process.

The term computer readable media as used herein may include computer storage media and communication media. Computer storage media may include volatile and nonvolatile, removable and non-removable media implemented in any method or technology for storage of information, such as computer readable instructions, data structures, program modules, or other data. The system memory 504, the removable storage device 509, and the non-removable storage device 510 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by the computing device 500. Any such computer storage media may be part of the computing device 500.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 6A:
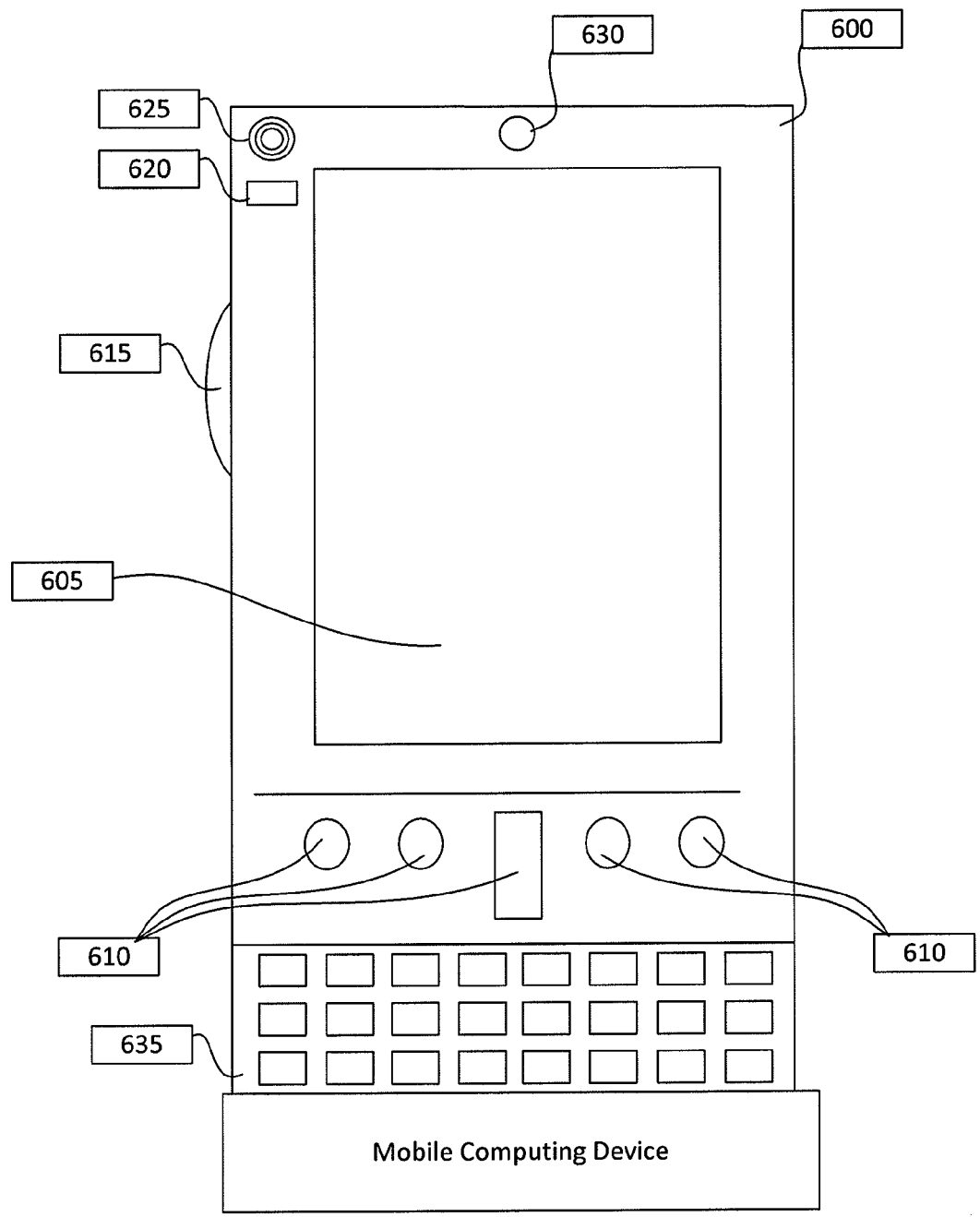
FIG. 6A illustrates one embodiment of a mobile computing device executing one or more embodiments disclosed herein.
Figure 6B:
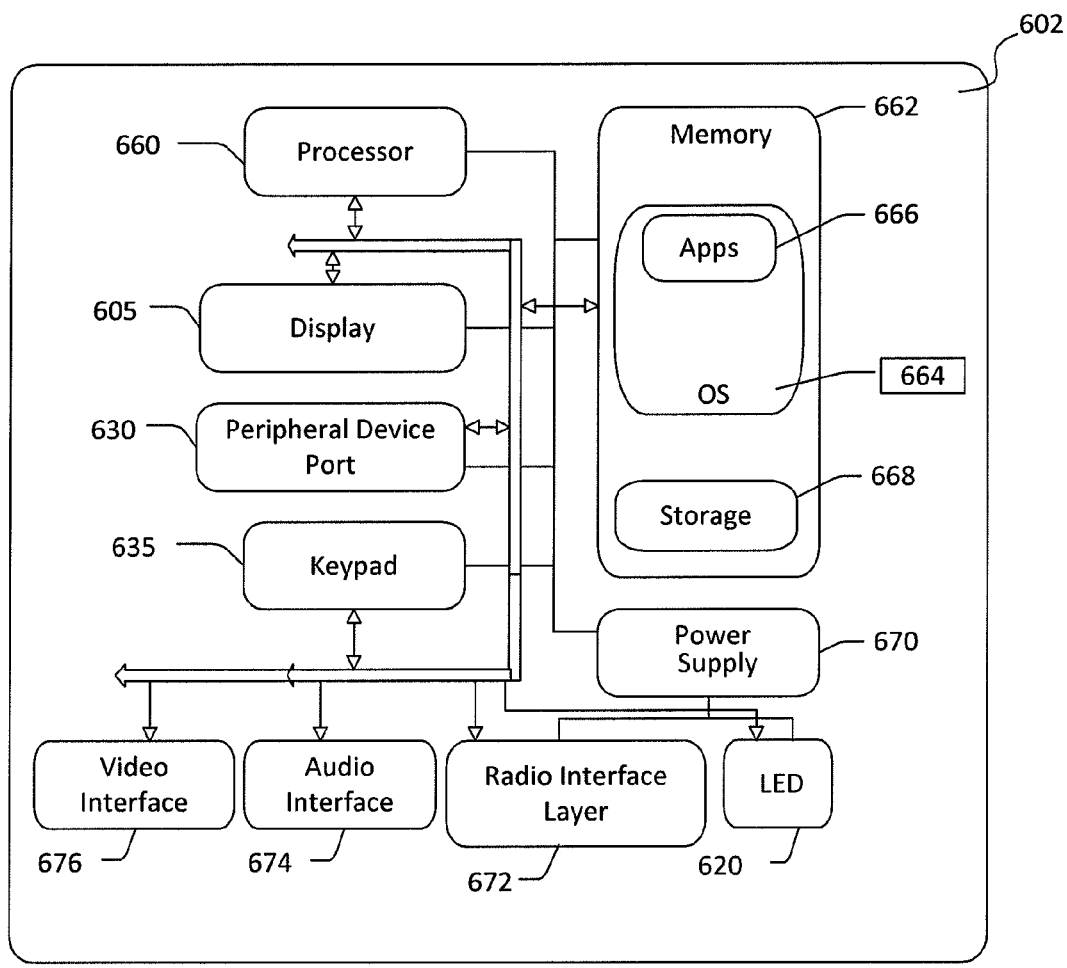
FIG. 6B is a simplified block diagram of an exemplary mobile computing device suitable for practicing one or more embodiments disclosed herein.
Figure 7:
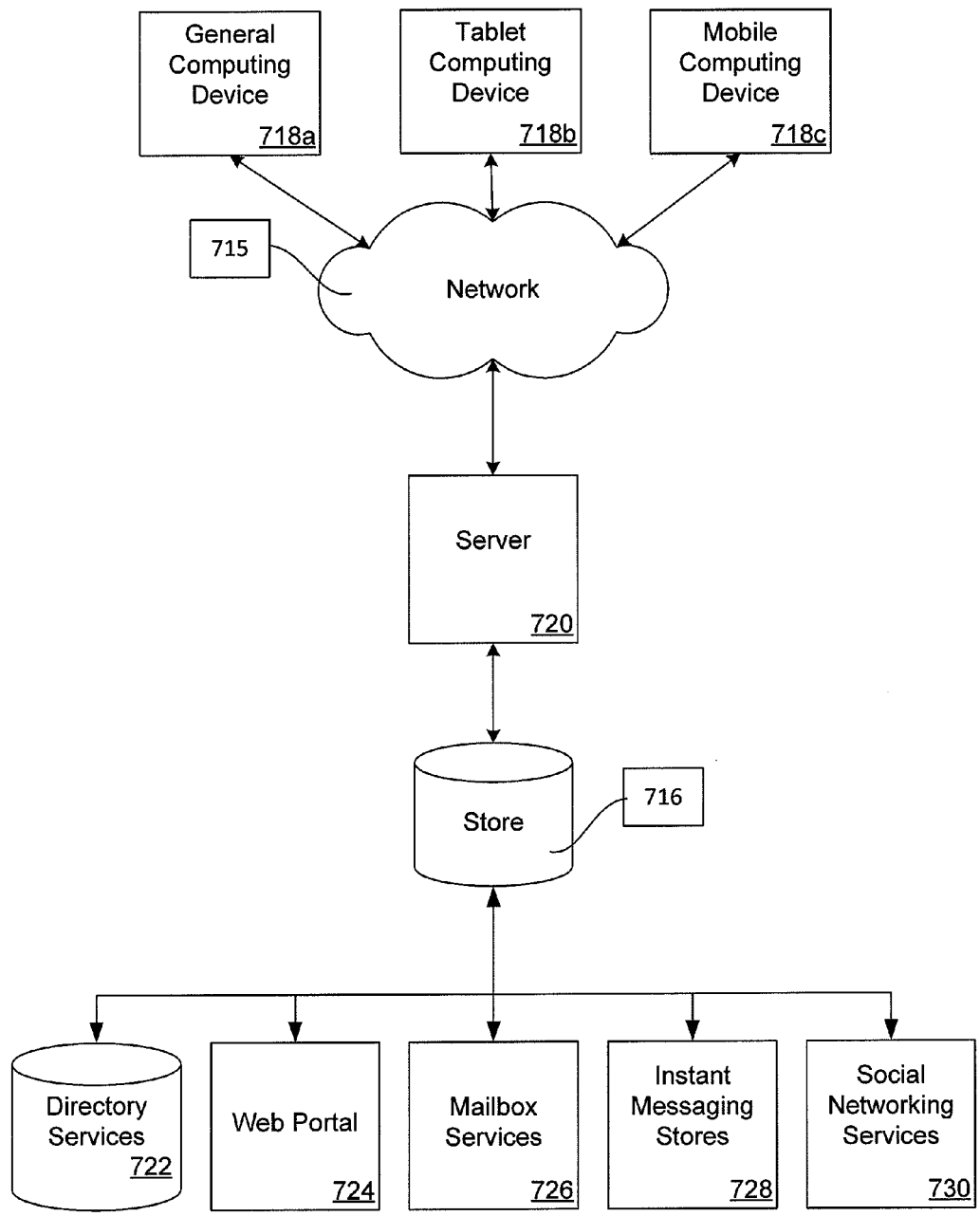
FIG. 7 is a simplified block diagram of an exemplary distributed computing system suitable for practicing one or more embodiments disclosed herein.

FIGS. 6A and 6B illustrate a mobile computing device 600, for example, a mobile telephone, a smart phone, a tablet personal computer, a laptop computer, and the like, with which embodiments of the present disclosure may be practiced. With reference to FIG. 6A, an exemplary mobile computing device 600 for implementing the embodiments is illustrated. In a basic configuration, the mobile computing device 600 is a handheld computer having both input elements and output elements. The mobile computing device 600 typically includes a display 605 and one or more input buttons 610 that allow the user to enter information into the mobile computing device 600. The display 605 of the mobile computing device 600 may also function as an input device (e.g., a touch screen display). If included, an optional side input element 615 allows further user input. The side input element 615 may be a rotary switch, a button, or any other type of manual input element. In alternative embodiments, mobile computing device 600 may incorporate more or less input elements. For example, the display 605 may not be a touch screen in some embodiments. In yet another alternative embodiment, the mobile computing device 600 is a portable phone system, such as a cellular phone. The mobile computing device 600 may also include an optional keypad 635. Optional keypad 635 may be a physical keypad or a "soft" keypad generated on the touch screen display. In various embodiments, the output elements include the display 605 for showing a graphical user interface (GUI), a visual indicator 620 (e.g., a light emitting diode), and/or an audio transducer 625 (e.g., a speaker). In some embodiments, the mobile computing device 600 incorporates a vibration transducer for providing the user with tactile feedback. In yet another embodiment, the mobile computing device 600 incorporates input and/or output ports, such as an audio input (e.g., a microphone jack), an audio output (e.g., a headphone jack), and a video output (e.g., a HDMI port) for sending signals to or receiving signals from an external device.

FIG. 6B is a block diagram illustrating the architecture of one embodiment of a mobile computing device. That is, the mobile computing device 600 can incorporate a system (i.e., an architecture) 602 to implement some embodiments. In one embodiment, the system 602 is implemented as a "smart phone" capable of running one or more applications (e.g., browser, e-mail, calendaring, contact managers, messaging clients, games, and media clients/players). In some embodiments, the system 602 is integrated as a computing device, such as an integrated personal digital assistant (PDA) and wireless phone.

One or more application programs 666 may be loaded into the memory 662 and run on or in association with the operating system 664. Examples of the application programs include phone dialer programs, e-mail programs, personal information management (PIM) programs, word processing programs, spreadsheet programs, Internet browser programs, messaging programs, and so forth. The system 602 also includes a non-volatile storage area 668 within the memory 662. The non-volatile storage area 668 may be used to store persistent information that should not be lost if the system 602 is powered down. The application programs 666 may use and store information in the non-volatile storage area 668, such as e-mail or other messages used by an e-mail application, and the like. A synchronization application (not shown) also resides on the system 602 and is programmed to interact with a corresponding synchronization application resident on a host computer to keep the information stored in the non-volatile storage area 668 synchronized with corresponding information stored at the host computer. As should be appreciated, other applications may be loaded into the memory 662 and run on the mobile computing device 600.

The system 602 has a power supply 670, which may be implemented as one or more batteries. The power supply 670 might further include an external power source, such as an AC adapter or a powered docking cradle that supplements or recharges the batteries.

The system 602 may also include a radio 672 that performs the function of transmitting and receiving radio frequency communications. The radio 672 facilitates wireless connectivity between the system 602 and the "outside world", via a communications carrier or service provider. Transmissions to and from the radio 672 are conducted under control of the operating system 664. In other words, communications received by the radio 672 may be disseminated to the application programs 666 via the operating system 664, and vice versa.

The radio 672 allows the system 602 to communicate with other computing devices, such as over a network. The radio 672 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

This embodiment of the system 602 provides notifications using the visual indicator 620 that can be used to provide visual notifications and/or an audio interface 674 producing audible notifications via the audio transducer 625. In the illustrated embodiment, the visual indicator 620 is a light emitting diode (LED) and the audio transducer 625 is a speaker. These devices may be directly coupled to the power supply 670 so that when activated, they remain on for a duration dictated by the notification mechanism even though the processor 660 and other components might shut down for conserving battery power. The LED may be programmed to remain on indefinitely until the user takes action to indicate the powered-on status of the device. The audio interface 674 is used to provide audible signals to and receive audible signals from the user. For example, in addition to being coupled to the audio transducer 625, the audio interface 674 may also be coupled to a microphone to receive audible input, such as to facilitate a telephone conversation. In accordance with embodiments of the present disclosure, the microphone may also serve as an audio sensor to facilitate control of notifications, as will be described below. The system 602 may further include a video interface 676 that enables an operation of an on-board camera 630 to record still images, video stream, and the like.

A mobile computing device 600 implementing the system 602 may have additional features or functionality. For example, the mobile computing device 600 may also include additional data storage devices (removable and/or non-removable) such as, magnetic disks, optical disks, or tape. Such additional storage is illustrated in FIG. 6B by the non-volatile storage area 668. Computer storage media may include volatile and nonvolatile, removable and non-removable media implemented in any method or technology for storage of information, such as computer readable instructions, data structures, program modules, or other data.

Data/information generated or captured by the mobile computing device 600 and stored via the system 602 may be stored locally on the mobile computing device 600, as described above, or the data may be stored on any number of storage media that may be accessed by the device via the radio 672 or via a wired connection between the mobile computing device 600 and a separate computing device associated with the mobile computing device 600, for example, a server computer in a distributed computing network, such as the Internet. As should be appreciated such data/information may be accessed via the mobile computing device 600 via the radio 672 or via a distributed computing network. Similarly, such data/information may be readily transferred between computing devices for storage and use according to well-known data/information transfer and storage means, including electronic mail and collaborative data/information sharing systems.

FIG. 7 illustrates one embodiment of the architecture of a system described above. Content that is shared between the components of the system may be stored in different communication channels or other storage types. For example, content may be stored using a directory service 722, a web portal 724, a mailbox service 726, an instant messaging store 728, or a social networking site 730. A server 720 may provide the content to clients. As one example, the server 720 may be a web server providing the content over the web. The server 720 may provide the content over the web to clients through a network 715. By way of example, the client computing device 718 may be implemented as the computing device 700 and embodied in a personal computer 718*a*, a tablet computing device 718*b* and/or a mobile computing device 718*c* (e.g., a smart phone). Any of these embodiments of the client computing device 718 may obtain content from the store 716. In various embodiments, the types of networks used for communication between the computing devices that make up the present disclosure include, but are not limited to, an internet, an intranet, wide area networks (WAN), local area networks (LAN), and virtual private networks (VPN). In the present application, the networks include the enterprise network and the network through which the client computing device accesses the enterprise network (i.e., the client network). In one embodiment, the client network is part of the enterprise network. In another embodiment, the client network is a separate network accessing the enterprise network through externally available entry points, such as a gateway, a remote access protocol, or a public or private internet address.

One skilled in the relevant art may recognize, however, that the embodiments may be practiced without one or more of the specific details, or with other methods, resources, materials, etc. In other instances, well known structures, resources, or operations have not been shown or described in detail merely to avoid obscuring aspects of the embodiments.

The description and illustration of one or more embodiments provided in this application are not intended to limit or restrict the scope of the claims in any way. The embodiments, examples, and details provided in this application are considered sufficient to convey possession and enable others to make and use the best mode of the claimed subject matter. The claimed subject matter should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the general inventive concept embodied in this application that do not depart from the broader scope of the claims.

What is claimed is:

1. A method for establishing an authenticated session between a client computing device and a remote computing device, the method comprising:
    establishing a connection with the remote computing device;
    sending a negotiate request to the remote computing device, wherein the negotiate request includes a first set of information;
    receiving a negotiate response from the remote computing device, wherein the negotiate response includes a second set of information associated with the first set of information;
    sending a setup request to the remote computing device;
    receiving a setup response from the remote computing device;
    sending a signed validation request to the remote computing device, wherein the signed validation request includes a third set of information that is equivalent to the first set of information;
    receiving a signed validation response from the remote computing device, wherein the signed validation response includes a fourth set of information;
    determining whether the fourth set of information is equivalent to the second set of information; and
    establishing the authenticated session with the remote computing device when the fourth set of information is equivalent to the second set of information.

2. The method of claim 1, wherein the first set of information includes one or more of capability information of the client computing device, an identifier that identifies the client computing device, a protocol dialect version supported by the client computing device and a security mode of the client computing device.

3. The method of claim 1, wherein the second set of information includes one or more of capability information of the remote computing device, an identifier that identifies the remote computing device, a protocol dialect version supported by the remote computing device and a security mode of the remote computing device.

4. The method of claim 1, further comprising terminating the connection with the remote computing device when the signed validation response is not received by the client computing device before a predetermined amount of time has elapsed.

5. The method of claim 1, wherein sending a signed validation request to the remote computing device comprises signing the signed validation request with a shared secret associated with the client computing device and the remote computing device.

6. The method of claim 5, further comprising terminating the connection with the remote computing device when the signed validation response is not signed with the shared secret.

7. The method of claim 1, further comprising terminating the connection when the fourth set of information is not equivalent to the second set of information.

8. The method of claim 1, further comprising:
    determining whether the validation request is recognized by the remote computing device prior to determining whether the fourth set of information is equivalent to the second set of information;
    determining if the signed validation response is signed with a shared secret; and
    establishing the authenticated session with the remote computing device if the validation request is not recognized by the remote computing device but the signed validation response is signed with the shared secret.

9. A method for establishing an authenticated session between a remote computing device and a client computing device, the method comprising:
    receiving a negotiate request from the client computing device over a connection, wherein the negotiate request includes a first set of information;

sending a negotiate response to the client computing device, wherein the negotiate response includes a second set of information associated with the first set of information;
receiving a setup request from the client computing device;
sending a setup response to the client computing device;
receiving a signed validation request from the client computing device, wherein the signed validation request includes a third set of information;
determining whether the third set of information is equivalent to the first set of information; and
sending a signed validation response to the client computing device when the third set of information is equivalent to the first set of information.

10. The method of claim 9, wherein the signed validation response includes a fourth set of information that is equivalent to the second set of information.

11. The method of claim 9, wherein the first set of information includes one or more of capability information of the client computing device, an identifier that identifies the client computing device, a protocol dialect version supported by the client computing device and a security mode of the client computing device.

12. The method of claim 9, wherein the second set of information includes one or more of capability information of the remote computing device, an identifier that identifies the remote computing device, a protocol dialect version supported by the remote computing device and a security mode of the remote computing device.

13. The method of claim 9, wherein sending a signed validation request to the remote computing device comprises signing the signed validation request with a shared secret associated with the client computing device and the remote computing device.

14. The method of claim 13, further comprising terminating the connection with the client computing device when the signed validation request is not signed with the shared secret.

15. The method of claim 9, further comprising terminating the connection when the third set of information is not equivalent to the first set of information.

16. The method of claim 9, further comprising establishing the authenticated session with the client computing device.

17. A computer-readable memory encoding computer executable instructions that, when executed by at least one processor, performs a method for establishing an authenticated session between a client computing device and a remote computing device, the method comprising:
establishing a connection with the remote computing device;
sending a negotiate request to the remote computing device, wherein the negotiate request includes a first set of information;
receiving a negotiate response from the remote computing device, wherein the negotiate response includes a second set of information associated with the first set of information;
sending a setup request to the remote computing device;
receiving a setup response from the remote computing device;
sending a signed validation request to the remote computing device, wherein the signed validation request includes a third set of information that is equivalent to the first set of information;
receiving a signed validation response from the remote computing device, wherein the signed validation response includes a fourth set of information;
determining whether the fourth set of information is equivalent to the second set of information; and
establishing the authenticated session with the remote computing device when the fourth set of information is equivalent to the second set of information.

18. The computer-readable memory of claim 17, wherein the first set of information includes one or more of capability information of the client computing device, an identifier that identifies the client computing device, a protocol dialect version supported by the client computing device and a security mode of the client computing device.

19. The computer-readable memory of claim 17, wherein the second set of information includes one or more of capability information of the remote computing device, an identifier that identifies the remote computing device, a protocol dialect version supported by the remote computing device and a security mode of the remote computing device.

20. The computer-readable memory of claim 17, further comprising instructions for terminating the connection with the remote computing device when the signed validation response is not received by the client computing device before a predetermined amount of time has elapsed.

* * * * *